United States Patent [19]
Landis

[11] Patent Number: 4,563,149
[45] Date of Patent: Jan. 7, 1986

[54] INJECTION MOLDING APPARATUS
[75] Inventor: H. Richard Landis, Oak Lawn, Ill.
[73] Assignee: Landis Plastics Inc., Chicago Ridge, Ill.
[21] Appl. No.: 602,400
[22] Filed: Apr. 20, 1984
[51] Int. Cl.⁴ .................. B29C 45/20; B29C 45/22
[52] U.S. Cl. ........................ 425/547; 264/328.8; 264/328.9; 264/328.15; 425/548; 425/549; 425/570; 425/572; 425/588
[58] Field of Search ........... 425/548, 549, 570, 547, 425/588, 572; 264/328.8, 328.9, 328.15

[56] References Cited
U.S. PATENT DOCUMENTS
4,422,841 12/1983 Alfonsi ............................ 425/548

OTHER PUBLICATIONS
Rama ®/SVAB ® Runnerless Molding System Catalog 491.
Unitemp Pamphlet (undated).

Primary Examiner—Jay H. Woo
Assistant Examiner—Timothy W. Heitbrink
Attorney, Agent, or Firm—Fitch, Even, Tabin & Flannery

[57] ABSTRACT

Apparatus for forming objects from molten material includes a mold frame and a movable mold side having complementary faces that define molding cavities. The mold frame includes a mold housing having an internally heated manifold which has a plastic distribution channel for feeding plastic to an injection nozzle passageway having a restricted discharge nozzle that discharges the plastic into a molding cavity. Within the injection nozzle passageway is a heater probe which has an internal heater, preferably an electrical cartridge heater. The probe is secured by an integral seating flange to the mold housing to hold the probe coaxially aligned in the injection nozzle passageway and to hold the probe against shifting with thermal expansion and contraction of the manifold. The integral flange may be positioned at or adjacent the exterior of the mold so that it can be pulled outwardly to remove an elongated body of the probe from the nozzle passageway for easy replacement of the internal cartridge heater disposed within the interior of the probe. The electrical cartridge heater is substantially lower in cost than external electrical band heaters used heretofore for heating plastic flowing internally through a probe.

2 Claims, 3 Drawing Figures

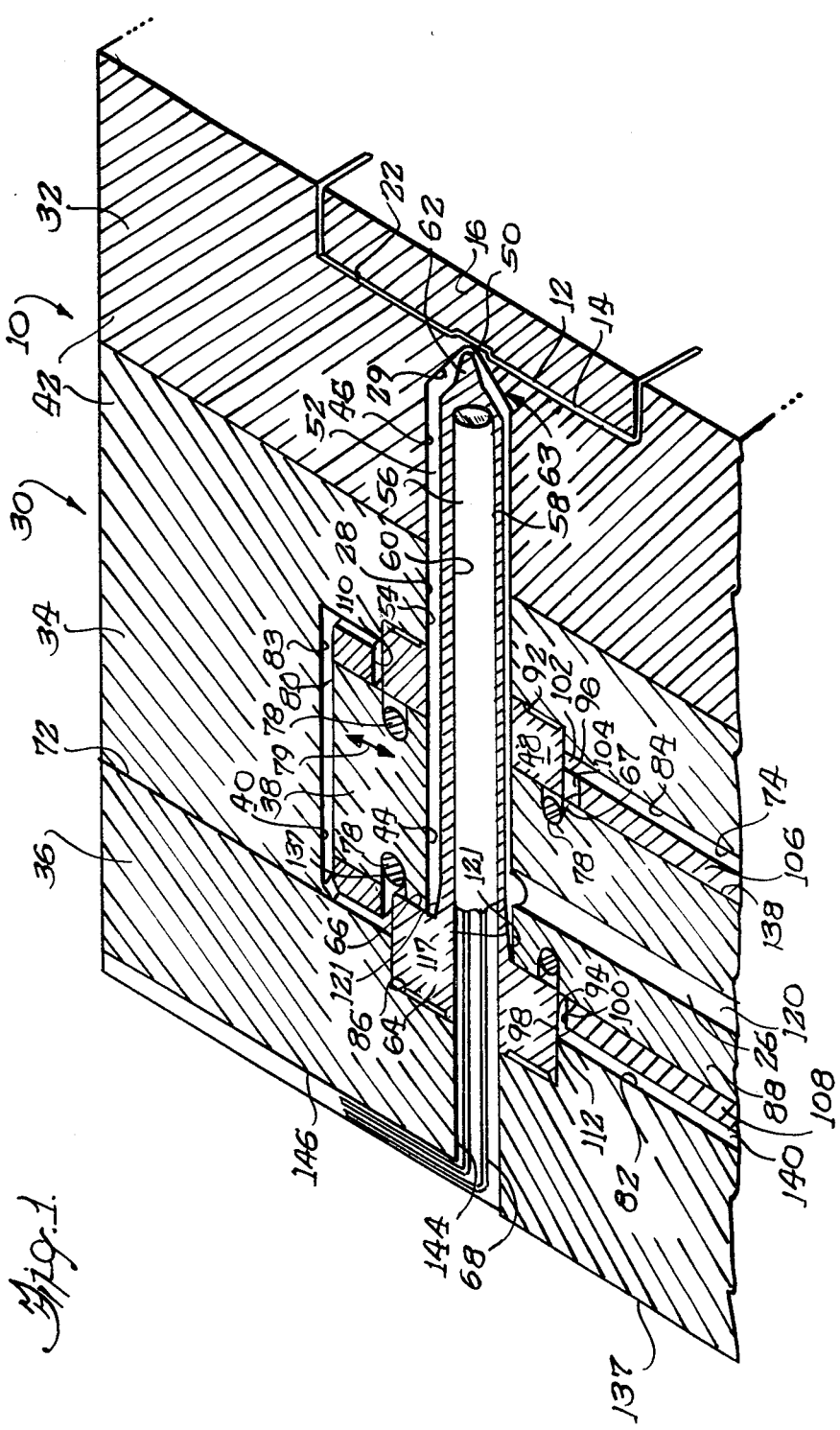

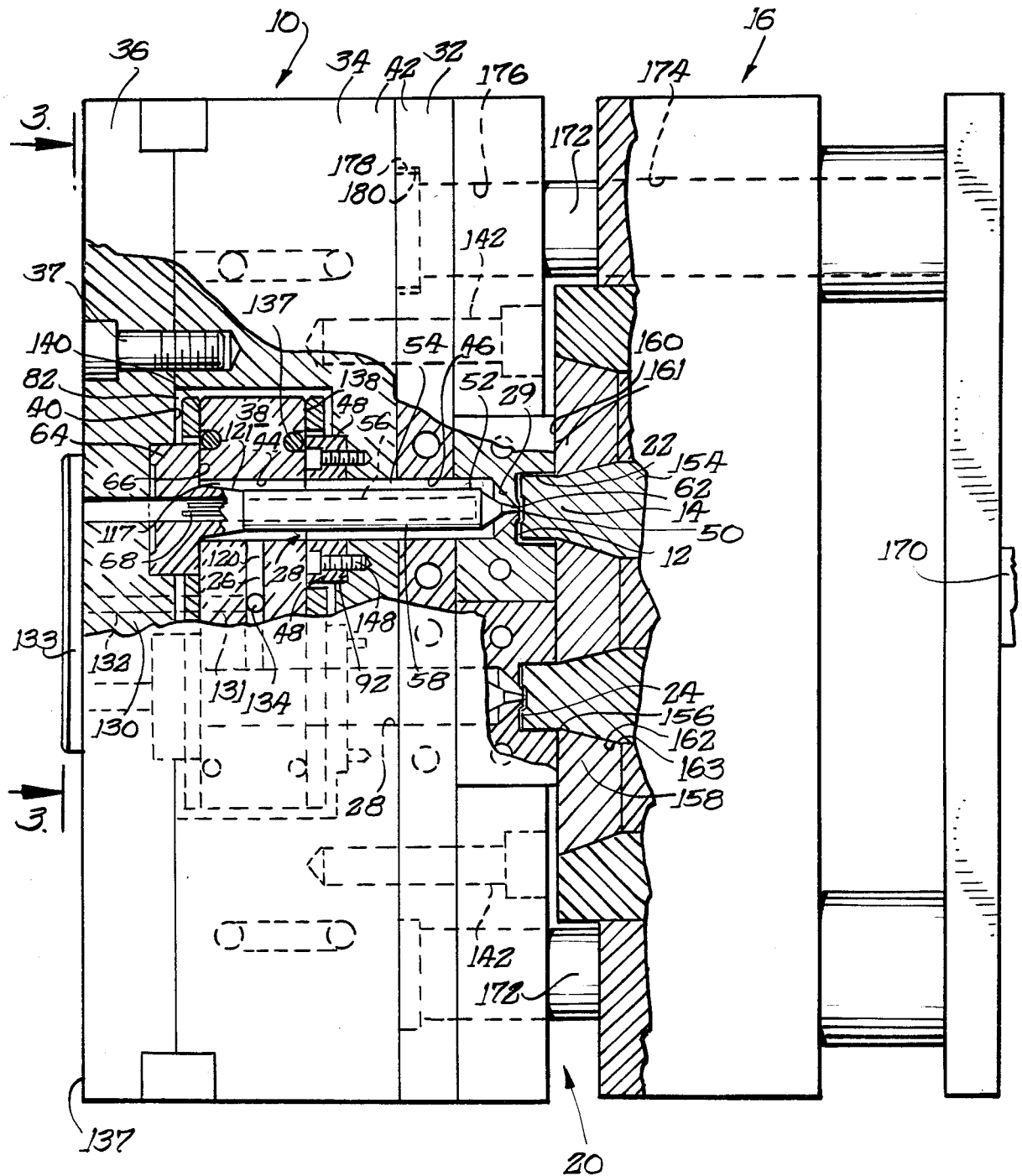

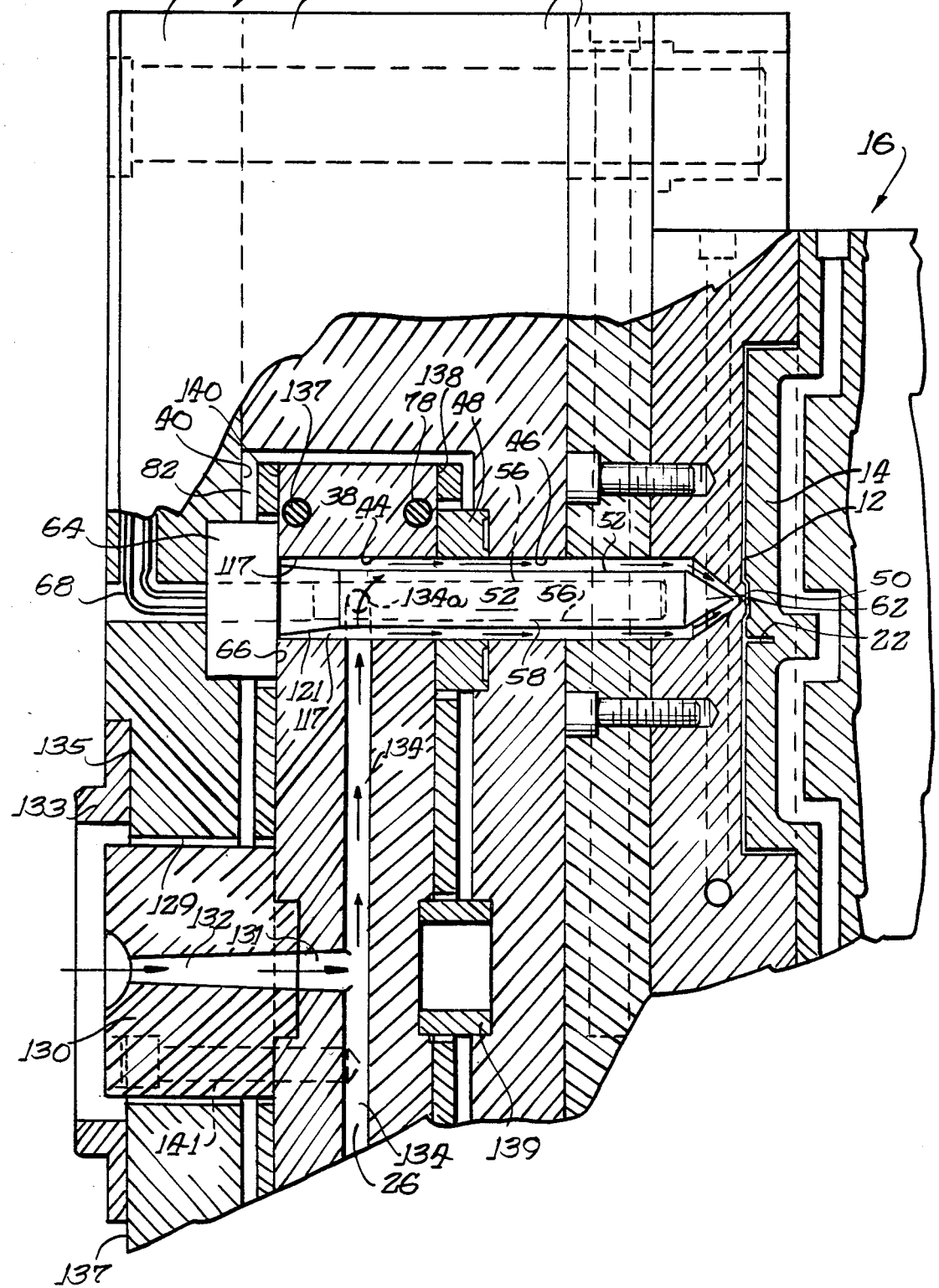

INJECTION MOLDING APPARATUS

The present invention relates to injection molding apparatus.

A large number of items are molded from molten material, typically thermoplastic of one type or another, in molding apparatus that consists of a movable mold side and a mold frame that have complementary faces which define one or more molding cavities. Molten material is injected into the molding cavities through injection nozzles within the molding frame.

In a typical molding apparatus for simultaneously molding several articles in a plurality of molding cavities, molten material is injected into the cavities by a corresponding number of individual nozzles which are each supplied with molten plastic through a channel network of a manifold distribution block. The manifold block is disposed within a housing comprising a plurality of plates, including a front plate having passageways through which the nozzles extend.

The molten plastic is supplied to the manifold channels from a molten plastic source at a high temperature, and to keep the plastic molten and flowing, the molten plastic passageways are maintained at a high temperature by heating the manifold block and also by directly heating the nozzles. The manifold block and the channels therein are heated by resistance heating elements contained within the block itself. In an existing type of molding apparatus, the nozzles that extend from the manifold block through the front portion of the housing to the molding cavities have central hollow passageways in a probe for the flow of molten plastic, and the probe is heated by external band resistance heater that surrounds the probe.

The arrangement of nozzles having internal flow passageways and band heater elements surrounding the hollow probes is expensive to manufacture and to maintain. The band heaters are quite expensive, and have a limited life. The band heaters are located inwardly of the mold base plate and manifold, thereby requiring a considerable amount of time and work for replacement, and thus, entailing a considerable expense each time they need to be replaced.

To assure adequate transfer of heat from surrounding external heating elements to injection nozzles, the band heater are unprotected, and if molten plastic seeps along the side of the nozzles, the band heater element may be damaged.

Because of their relatively large size, the band heaters do not extend along the entire length of probe particularly in the region of the front tip of the probe which the nozzle feeds the cavity, and as a consequence, the nozzles are made of expensive materials, such as beryllium-copper-hardened steel alloy to assure adequate transfer of heat to the front tip to keep the plastic molten. The probe tips are difficult to machine and suffer wear due to plastic flow. As stated, these band heaters are often disposed in rather inaccessible locations within a mold half and their replacement entails considerable disassembly of the mold frame, adding to the expense of heating element replacement.

It is a primary object of the present invention to provide a new and improve molding apparatus having internally heated injection nozzles receiving plastic from a heated manifold. Another object of the invention is to provide heating elements which are much more accessible for maintenance, e.g., replacement.

Molding apparatus according to the present invention includes a mold frame and a movable mold side which have complementary faces that together provide a plurality of molding cavities. The mold frame includes a mold base and a carrier plate with a heated molten material distribution block or manifold. The heated distribution block has a channel system which distributes molten plastic to heated injection nozzles for injecting plastic into the molding cavities. The injection nozzles include a cylindrical probe that is inserted axially into a passageway extending from the base plate through the manifold to the mold cavity injection orifice proportioned to leave an annular channel around the probe through which molten plastic flows to a constricted orifice leading into the molding cavity.

Because the distribution block is heated while the mold housing is not, the distribution block expands and contracts during heating and cooling relative to the mold housing. To accommodate its differential expansion, the distribution block is proportioned and positioned within a recess in the mold half to leave an air gap on all sides. The expansion differential between the distribution block and the surrounding mold plates causes the rear passageway segments through the distribution block to shift relative to a passageway segment through the front portion of the housing. As the front end of the heating probe cooperates with the surrounding front passageway segment to channel the molten material through the orifice, it is important that the heating probe remain centered relative to the front passageway segment. Accordingly, each heating probe is held in position by the rear portion of the housing so that it retains its position relative to the front passageway segment even as the rear manifold distribution block passageway segment shifts laterally slightly during expansion and contraction. In addition to the air gap that is provided along the sides of the manifold block, components, which are secured to the housing and function to position the distribution block in a front to rear direction within the void region and which have lateral edges that face lateral edges of the manifold block, are proportioned so as to leave air gaps between the facing lateral edges to accommodate the relative shifting of the manifold block during expansion and contraction.

These and other objects and advantages will be more fully described in the following detailed description of the drawings in reference to the accompanying drawings of which:

FIG. 1 is a perspective sectional view of a portion of a mold frame, showing a single injection passageway embodying various features of the present invention;

FIG. 2 is a side view of molding apparatus, partially in cross section, including injection passageways, such as those shown in FIG. 1; and FIG. 3 is an enlarged end view, partially in section, taken along line 3—3 of FIG. 2.

Illustrated in FIG. 1 is a section of a mold half or frame 10 which has a mold face with a cavity or recess 12 to cooperate with another facing recess or projection 14 on a second mold half 16 to define a molding cavity 22 in which objects, e.g., container covers 24 (FIG. 2), are formed by molten plastic injection molding. The mold half 10 has a manifold 38 and a channel system 36 therein that distributes molten plastic to individual injection nozzle passageways 28 that lead to individual molding cavities 22. Heating means 56, 78 in the manifold maintain the plastic material heated in its molten state as it flows through the distribution channels 26 and into the injection nozzle passageway.

The mold half 10 includes (from right to left with respect to FIG. 1) a front plate 32, a central or carrier plate 34 and a rear or base plate 36. The illustrated manifold 38 is a box-shaped manifold distribution block that is received in a similarly shaped space 40 defined between the carrier and base plates 34, 36.

As best seen by the heavy arrows in FIG. 3, the plastic is injected under pressure through an inlet port fitting 130 in the base plate 36 and through its inlet channel 132 into an axially aligned channel segment 131 for flow upwardly as viewed in FIG. 3 through an elongated upwardly extending manifold channel 134 which has a discharge outlet 134a to discharge molten plastic into an annular nozzle passageway for flow principally to the right as viewed in FIG. 3 to discharge into the mold cavity 22 through a restricted orifice 50 at the discharge end of the nozzle passageway 28. A cylindrical heating probe 52 heats the plastic.

Heretofore, the heating probe was formed with a hollow interior through which the plastic flowed and a surrounding band heater heated the exterior of the probe at a location which would be to the right of manifold block as viewed in FIG. 3. One problem with band heaters at this location is that they are difficult to access for repair or replacement because it is necessary to remove the base plate 36 as well as the manifold 38 and the carrier plate 34 before one could remove or work on the electrical band heater encircling the probe. Further such band heaters are relatively expensive as contrasted to other types of electrical heaters.

In accordance with the present invention there is an easily removable injection heating probe 52 which extends from the mold base 34 through an opening in the manifold 38 and to adjacent the discharge orifice 50 of the mold cavity 22 and which is secured against shifting relative to the manifold which shifts with expansion and contraction because of hot plastic flow therein.

Further, the preferred embodiment of the invention uses an internal electric cartridge heater 56 carried within the hollow interior of the probe 52. The cartridge heater is relatively inexpensive compared to the cost of the typical band heater. As will be explained in greater detail, the preferred probe is a generally cylindrical member having a hollow interior chamber with the electrical resistance cartridge heater therein and which is held in a central axially aligned position within the injection passageway to define a generally annular or hollow cylindrical passageway shape through which the heated plastic flows, to the right as viewed in FIG. 3, to discharge at the orifice 50 into the mold cavity 22. Also as will be explained in greater detail, the probe 52 has an integral enlarged base 64 which is seated in a seat in a base plate and held so that it will not be moved; and thus, the axially located position for the probe is maintained even though there may be shifting of the manifold relative to the probe because of heating and cooling of the manifold.

In the preferred embodiment of the invention, removal of the base plate 36 allows access to an enlarged end 64 of the probe 52 which then can be pulled through hollow passageway in the manifold 38, the carrier plate 34 and in the base plate 36. Another probe may be readily installed with little down time because there is no need to remove the manifold or carrier plates as heretofore was the case with the band heaters. In other embodiments of the invention not illustrated herein, in which the molds are stacked with mold layers positioned back to back, the enlarged flanges may be facing internally and not readily removed.

The molten plastic distribution channels 26 are formed in the manifold block 38, and the individual injection passageways 28 each consist of aligned cylindrical segments, including a rear segment 44 extending entirely through the manifold block 38, and a front segment 46 that extends through the front portion 42 of the housing 30, including openings through annular bushings 48 that are attached to the central plate 34 for spacing the manifold block therefrom. The front and rear passageway segments 44, 46 align to form a straight cylindrical injection passageway 28 that is of uniform diameter except at the front end 29 where the passageway is conical, narrowing to a constricted orifice 50 that opens to the molding cavity 22.

The passageways 28 are each heated by means of an internal heating probe 52 that is received axially within the passageway 28 and is narrowly proportioned relative to the diameter of the passageway to leave an annular channel 54 through which plastic flows to the orifice 50. The heating probe 52 consists of the cylindrical resistance heating elements 56, e.g., a Calrod heating element, that is protected by an outer metal sheath 58 which has an axial blind bore 60 of a diameter matched to that of the rod-shaped element for receiving the element in an interference fit. The front end of the sheath 58 beyond the bore 60 covers the front end of the heating element 56 and narrows to a tip 62 that functions with the narrowing diameter front end 29 of the passageway 28 as an injection nozzle 63. The rear of the sheath 58 is radially enlarged to provide an annular flange 64, the front surface 66 of which closes off the rear end of the injection passageway 28. The sheath blind bore 60 opens to the rear end of the sheath 58 and the electrical leads 68 to the resistance heating element 56 extend from the bore.

In accordance with the present invention, in a molding assembly 20 including the movable mold side 16 and the mold frame 10 that together define at least one molding cavity 22 to which molten plastic flows through an injection passageway 28 in the mold frame, heating of the injection passageway is provided by the internal heating probe 52 that is axially insertable into the passageway and removable therefrom for periodic maintenance. The probe 52 is held in the passageway by the rear base plate 36 of the housing 30 and the rear housing portion is secured to the front portion 42 of the housing in a removable manner, allowing access to the probe and passageway when the rear portion is removed. The invention facilitates the use of a heating probe 52 that is internally heated rather than using a conventional probe having a central flow passageway and which is surrounded by and heated by an external element. Internally heated probes 52 are much less expensive than the combination of an externally heated probe and an external heating element, the internally heated probe typically being about one-fifteenth of the cost of the external heating element itself. Furthermore, as the internally heated probe 52 is directly heated substantially throughout its length, its outer sheath 58 need not be made of expensive alloys, such as a copper-beryllium-hardened steel alloy, which are often used in externally heated probes to assure adequate heat conduction, e.g., to the tip 62. Whereas external heating elements are frequently disposed at a location within a mold frame from where replacement is time-consuming and expensive, the invention provides for very rapid replacement of a spent heating element 56 from the heater probe without disassembling the mold or removal of the base plate. The rear plate 36 is held to the front housing portion 42 by threaded members 70, e.g., bolts, and upon removal of the rear plate, the old heating probe 52 may be slid out from the passageway 28 and a new probe slid in.

The space or void region 40 that receives the manifold block 38 is defined between the front surface 72 of the rear plate and a large rectangular hollow 74 formed in the central plate 34 extending internally from its rear surface 76. The manifold block 38 is heated to high temperatures during molding by resistance heating elements 78, such as a Calrod heating element, and expands when heated. The housing plates 32, 34, and 36 themselves are not directly heated by heating elements, and accordingly, there is slight but significant expansion and contraction of the manifold block 38 relative to the plates. To accommodate outward expansion of the manifold block 38 relative to the housing 30, the manifold block 38 is proportioned slightly smaller than the void region 40, leaving an air gap 82 along all sides of the manifold block. Relative shifting movement of the manifold block 38 is represented in FIG. 1 by the arrow 79 that shows the direction of movement of the illustrated upper lateral edge 80 of the manifold block relative to the adjacent lateral edge surface 83 of the central plate 34.

It can easily be appreciated that the relative shifting of the manifold block 38 and its passageway segment 44 creates problems in providing a straight passageway 28 that includes both the rear manifold block segment 44 and the front housing segment 46. In order that the probe 52 cooperate with the passageway 28 to best direct flow through the orifice 50, the probe tip 62 should remain centered relative to the injection orifice 50, that is, the probe 52 should remain axially centered relative to the front passageway segment 46. If the internally heated probe 52 used in the present invention were to shift along with the manifold block, it would become misaligned with front passageway segment 46.

In accordance with an important aspect of the present invention, the molding assembly 20 includes the movable mold side 16 and the mold frame 10 that together define molding cavities 22. The mold frame 10 includes the housing 30 that defines the internal region 40 and the manifold block 38 that is positioned within this internal region. The manifold block 38 has the channel system means 26 for distributing molten plastic to injection passageway means 28 that each include a manifold passageway segment 44 and a housing passageway segment 46 which leads to the molding cavity 22. Heating means 78 heat the manifold block to a temperature whereat molding material remains molten within the channel means, and spacing means 82 provide for shifting of the manifold block 38 relative to the housing 30 during thermal expansion and contraction. To keep the molding material molten as it passes through the injection passageways 28, the internal heating probes 52 extend through the passageways leaving surrounding channels 54 through which molten material flows. In order to assure that the heating probe 52 in each passageway 28 remains centered relative to the front housing passageway segment 46 even as the rear manifold block passageway segment 44 shifts during thermal expansion and contraction of the manifold block 38, the probe 52 is affixed to the housing 30, e.g., to its rear portion 36, so that its axial position with respect to the front passageway portion 46 is unaffected by the shifting manifold block.

As a means of positioning the probe relative to the housing, the illustrated embodiment has a cylindrical recess 86 in the front surface 72 of the rear plate 36 which is matched in diameter to the rear flange 64 of the probe sheath 58. The rear sheath flange 64 is received in this recess 86 in a tight fit, restraining the probe in axial alignment through the front passageway segment 46.

The manifold block 38 has a body 88 that is closely positioned in a front-to-rear direction between the front faces 66 of the rear flanges 64 of the probe sheath 58 and the rear faces 67 of the bushings 48, the bushings being attached to the housing 30, tightly received in closely matched cylindrical indentations 92 in the internal vertical wall 84 of the central plate hollow 74. So that the flanges 64 and bushings 48 do not interfere with the lateral expansion of the manifold block 38, air gaps 94, are provided between the lateral edges 98 of the sheath flanges 64 and facing lateral edges 100 of the manifold block, and air gaps 96 are also provided between the lateral edges 102 of the bushings 48 and the facing lateral edges 104 of the manifold block. In the illustrated embodiment, front and rear covers 106, 108 overlie the manifold block body 88, and in the regions of the bushings 48 and the rear flanges 64 of the probe sheath 58, the front cover and rear cover have circular openings 110, 112 through which the bushings and flanges extend, and the greater diameters of the openings relative to the encircled bushings and flanges provide the air gaps 96, 94.

During expansion of the manifold block 38, the rear manifold segment 44 of the passageway 28 rearranges relative to the housing passageway segment 46. Preferably, the manifold block 38 is machined so that its passageway segments 44 axially align with the front housing passageway segments 46 during those times when the manifold block is heated to the injection molding temperature. Although the rearrangement of the manifold block relative to the housing 30 and probe 52 is significant, it is nevertheless slight, and the manifold block 38 never makes contact with the probe 52. Any slight misalignment of the rear passageway segments 44 with the front passageway segments 46 during injection molding is considered inconsequential. For example, in a typical embodiment, the passageway diameter is $\frac{7}{8}$ inch, and the probe diameter is $\frac{3}{8}$ inch leaving a $\frac{1}{4}$ inch annular region. Thus while the rear passageway segments 44 readjust relative to the front passageway segments 46 and to the probes 52 that are held in a fixed position relative to the housing 30, the manifold block 38 does not impinge on the probes themselves during expansion and contraction.

In addition to lateral expansion of the manifold block 38, there is some front to rear expansion; however, because the front to rear dimension of the block is significantly less than its lateral dimensions, expansion in this direction is less. The thickness of the manifold block body 88 is proportioned to take account of its expansion during heating so that when heated in anticipation of molding, its front and rear surfaces press tightly against the opposed faces 67, 66 of the bushings 48 and rear sheath flanges 64, preventing plastic from seeping from the passageway 28, while when cooled, slight gaps exists between the manifold block body and the bushings 48 and rear sheath flanges 64. The front and rear manifold block covers 106, 108 are relatively thin and are spaced by the bushings 48 and rear sheath flanges 64 from the vertical internal wall 84 of the central plate 34 and the front surface 72 of the rear plate 36, respectively. While the rear passageway segment 44 extends entirely through the manifold block body 88 the channel system 26 leading to the passageway 28 run centrally (in a front to rear direction) through the manifold block intersecting the rear passageway segment 44 at about its midpoint. Thus, about half of each rear passageway segment 44 extends rearward of the intersection with the channel system 26. In the illustrated embodiment, the length of the heating element 56 is such that the passageway 28 is directly heated by the element from the channel system 26 intersection forward only, and there is a tendency for the passageway region 117 rearward of the channel to become cooler and for plastic to solidy therein. To alleviate this problem, the sheath 58 in front of the flange 64 has a tapered segment 121, narrowing at a very slight angle, e.g., about 5°, from the rear flange 64 forward to closely adjacent the rear end of the heating element 56, thereby constricting the channel region 117 from the channel intersection rearward. If plastic begins to solidify as a plug in this contricted channel region 117, the natural expansion of the plastic upon solidifying creates a pressure that causes the plug of solidified plastic to slide forward from the constricted along the tapered segment 121 to a less contricted hotter region of the passageway where the plastic remelts.

Illustrated in FIG. 2 in somewhat greater detail is the molding assembly 20 including the mold frame 10 in which a plurality of injection passageways 28 are fed through the channel network 26 within the manifold block 38 and the movable mold side 16. A pair of injection passageways 28 of the type described with reference to FIG. 1 are illustrated in FIG. 2 and an additional pair of passageways lie directly behind these passageways spaced longitudinally from the illustrated pair. Molten plastic is fed to the passageways from an external source (not shown) that is connected to a molten plastic inlet port fitting 130. From a channel 132 through the inlet port fitting 130, molten plastic flows to the channel system 26 in the manifold block 38 that includes an elongated channel 134 extending in opposite directions from adjacent to the inlet port 132 and the perpendicular branch channels 120 leading from the ends of the elongated channel into the block 38 injection passageways 28.

The inlet port fitting 130, seen in greater detail in FIG. 3, extends through an opening 129 (FIG. 3) in the rear plate 36 and interfits at its front end with the manifold block 38 to communicate its inlet channel 132 with a short channel segment 131 that extends to the elongated channel 134. The inlet port 130 is laterally restrained relative to the rear plate 36 by a collar 133 that is received in a close fit within central indentation 135 (FIG. 3) in the rear surface 137 of the rear plate 36. The inlet port 130 is attached with a bolt 141 (FIG. 3) to the manifold block 38 and, along with an opposed bushing 139 that is attached to the central plate 34, centers the manifold block 38 laterally within the void region 40. Thus during thermal expansion, the manifold block 38 expands laterally outward from its center with its four rear passageway segments 44 adjusting substantially similarly relative to each of the four front passageway segments 46 and inserted probes 52.

As the means of maintaining the manifold block 38 at a temperature that assures that the plastic remains molten as it flows through the channel system 26, a network of grooves 137 (FIG. 1) are formed in the front and rear faces 138, 140 of the manifold block body 38 wherein the resistance heating elements 78 are received. The grooves 137 and resistance heating elements 78 run generally along the elongated channel 134, curving at the ends of the manifold blocks around the pairs of injection passageways 28. The front and rear manifold covers 106, 108 are attached with bolts (not shown) to the front and rear faces 138, 140 of the body 88, enclosing the heating elements 78 within the grooves 137.

The front plate 32 of the housing 30 is attached with bolts 142 (FIG. 2) to the central plate 34 in the manner that the rear plate 36 is attached with bolts 37 to the central plate. The rear plate 36 has bores 144 (FIG. 1) aligned axially with the sheath-flange retaining indentations through which the electrical leads 68 to the heating elements 56 extend and also a network of grooves 146 formed in its rear surface 137 through which the leads 68 extend to an electrical power source (not shown).

The bushings 48 which help to position the manifold block 38 within the void region 40 are each secured with bolts 148 (FIG. 2) within their mating cylindrical indentations 92. The rear sheath flanges 64, however, merely seat within their indentations 86 without bolting, being prevented by the manifold block 38 from dislocating from these indentations.

The movable side 16 of the mold assembly 10 will not be described in great detail herein, as it is of conventional design. Briefly, the movable side 16 has plates that define a face 160 which is complementary to the front 161 face of the mold frame 10, defining the molding cavities 22 when the complementary faces are pressed against each other. In the illustrated assembly 20, objects 24 are formed between indentations 12 in the mold frame 10 and the projections 14 of a main front plate 154 of the movable side 16. Lips 156 of the objects 24, however, are molded along edges of an ejector plate 158 that has inner surfaces 163 complementary to surfaces 162 of the main plate 154, e.g., frustoconical in the illustrated embodiment, for mating with the main plate 154 and cooperating therewith to provide a uniform face 160 to the mold frame 10 during molding. However, the ejector plate 158 is movable relative to the main plate 154 when the movable side 16 of the mold is spread apart from the mold frame 10 after objects 24 have been molded in the cavities 22. During spreading of the movable side 16 from the mold frame 10, the newly formed objects 24 are pulled by the projections 14 from the indentations 12, and after removal of the objects from the indentations, the ejector plate 158 is spread from the main plate 154, resulting in the ejector plate pushing against the lips 156 of the newly formed objects 24 and removing them from the projections. The ejected objects then fall vertically into a collection bin (not shown).

The movable side 16 is brought into contact with and spread apart from the mold frame 10 in a conventional manner, e.g., with pneumatic rams 170 (represented by a rod in FIG. 2). As a means for aligning the movable side 16 with the mold frame 10 during movable side travel, elongated leader pins 172 extend from the front of the mold frame into mating passageways 174 of the movable side. In the illustrated embodiment, the leader pins 172 are held by the front plate 32 of the mold frame with the leader pins extending through bores 176 through the front plate and enlarged heads 178 of the leader pins locked into countersunk bore portions 180 by the central plate 34.

Several advantages of the invention may now be more fully appreciated. The injection nozzles, consisting of passageway segments formed in the mold frame housing and manifold block and inexpensive internal heating probes, are much less expensive than nozzles formed of expensive heat-conducting alloys and encircled by very expensive cylindrical heating elements. In some embodiments, replacement of the inexpensive internal heating element is very simple, merely requiring that the spent heating element be removed from the bore 60 in the probe and a new heating element inserted into the bore 60 of the probe without removal of the probe from the base plate 36.

The internal heating probe is held by the housing axially centered within the front passageway segment and with respect to the injection orifice while the manifold and its passageway segment are permitted to shift laterally relative to the probe and housing passageway segment during thermal expansion and contraction.

While the invention has been described with reference to a preferred embodiment, modifications obvious to one with ordinary skill in the art may be made without departing from the scope of the invention.

Various features of the invention are recited in the following claims.

What is claimed is:

1. In a hot runner injection molding apparatus for molding plastic articles, the combination comprising:

a mold frame comprising a plurality of frame blocks with one of said blocks having a mold face with portions thereof defining a plurality of separate mold cavities each for receiving molten plastic therein, a plurality of channel means in said mold frame each terminating in an injection nozzle opening at each of the mold cavities, a substantially cylindrical heater probe extending through each of said channel means and having a substantially conical tip extending to and defining a portion of the injection nozzle opening at each of the mold cavities, said heater probes heating the plastic flowing into the mold cavities, a one piece integral manifold block disposed internally within the mold frame and having a plurality of distributing passageways therein each delivering molten plastic to one of the channel means, said one piece integral manifold block having a plurality of heater receiving passageways therein, a tubular heater in said heater receiving passageways in the manifold block to heat the same and the plastic flowing through said distributing passageways, said manifold block being mounted internally within the mold frame blocks and being spaced from portions thereof by clearance spaces allowing the manifold block to expand relative to the frame blocks when the plastic is passing through the manifold distributing passageways to the respective channel means, means having substantially cylindrical openings aligned about an axis through one of said heater probes which is extending therethrough and defining therewith a channel means of substantially annular shape about the probes leading to the injection nozzles, an internal rod shaped tubular heater disposed internally within each of said probes for heating the plastic flowing through the substantially annular channel means to the injection nozzles, and means on the probe for securing the probe to one of the mold frame blocks to hold the probe rigid within the substantially annular channel means as the manifold block expands and contracts said one piece integral manifold block having heater removal passageways therein axially aligned with the internal rod shaped tubular heater to allow replacement of the rod shaped heaters through the manifold block without disassemblying of the mold frame.

2. An apparatus in accordance with claim 1 in which said manifold block has a plurality of substantially cylindrical openings therein aligned with the openings in the frame blocks with each opening having a heater probe therein and defining therewith a portion of said annular channel means.

* * * * *